(12) United States Patent
Breau et al.

(10) Patent No.: US 8,594,105 B1
(45) Date of Patent: Nov. 26, 2013

(54) BASE-STATION PROVIDED ACCESS TO IMS SERVICES

(75) Inventors: Jeremy Breau, Leawood, KS (US); Serge Manning, Overland Park, KS (US); Pallavur Sankaranaraynan, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 206 days.

(21) Appl. No.: 13/180,786

(22) Filed: Jul. 12, 2011

(51) Int. Cl.
*H04L 12/28* (2006.01)

(52) U.S. Cl.
USPC ............................ 370/401; 370/329; 370/469

(58) Field of Classification Search
USPC ................. 370/328, 331, 400, 401, 431, 469; 709/227
See application file for complete search history.

(56) References Cited

U.S. PATENT DOCUMENTS

| | | | |
|---|---|---|---|
| 2009/0003208 A1* | 1/2009 | Payyappilly et al. | 370/230.1 |
| 2010/0106846 A1* | 4/2010 | Noldus et al. | 709/229 |
| 2010/0169483 A1* | 7/2010 | Jalkanen | 709/224 |

* cited by examiner

*Primary Examiner* — Kerri Rose

(57) ABSTRACT

Exemplary methods and systems for providing access to IMS services are disclosed herein. An exemplary method involves a first radio access network (RAN) component: (a) sending a registration message to an IMS network in order to register the first RAN component with the IMS network, wherein the IMS registration message provides an IP address at which to register the first RAN component, (b) receiving a service request from a first access terminal, wherein the first RAN component is a serving RAN component for the first access terminal, and (c) in response to receiving the service request, the first RAN component engaging in an IMS service on behalf of the first access terminal, wherein engaging in the IMS service on behalf of the first access terminal comprises sending the IMS network a first initiation message for a session event, wherein the first initiation message comprises: (i) a field that identifies the first access terminal and (ii) a field that includes an IP address of a second RAN component that serves a target access terminal.

21 Claims, 9 Drawing Sheets

| MSID | BSID | BS IP Address |
|---|---|---|
| 555-222-3333 | | 10.2.2.2@realm |
| 555-111-4444 | | 10.1.1.1@realm |
| . . . . . | . . . . . | . . . . . |
| 555-555-5555 | | 10.9.9.9@realm |

FIG. 5

BASE-STATION PROVIDED ACCESS TO IMS SERVICES

BACKGROUND

The advent and evolution in recent years of technologies and standards for high-rate transmission of packet data over cellular radio access networks has been part of a larger picture that includes advances in the development of packet transport networks and service networks for delivery of packet-data services, all collectively referred to as "third generation" (3G) networks. In the context of the larger picture, there have been industry-wide efforts to coordinate various elemental functions and subsystems within a common architectural framework and based upon common, standard interfaces and protocols for communication. Industry consortia including the $3^{rd}$ Generation Partnership Project (3GPP) and the 3GPP2, among others, have developed and published specifications relating to numerous aspects of 3G networks, from access devices, to access networks, to core transport networks, to service-delivery networks, as well as the communication methods that form the basis for network operation and services.

Packet-data transport and services in 3G networks are based in a large part on the "Internet Protocol" (IP) and the IP suite of protocol standards. As such, 3G networks themselves incorporate IP networks. In particular, IP-packet-based media services, such as "Voice over IP" (VoIP), video streaming, and packet-media broadcast collectively comprise an "IP Multimedia Subsystem" (IMS) network within a 3G system. Built upon standard signaling protocols, such as Session Initiation Protocol (SIP), standard media transport protocols, such as Real-time Transport Protocol (RTP), and standard policy management protocols such as Common Open Policy Service (COPS), among others, the IMS network provides an infrastructure for integrating new and emerging IP-based services for subscribers in 3G networks. In turn, owners and operators of 3G networks can generate revenue by charging subscribers for IMS-based services according to one or more fee structures, for example.

Within the IMS network, services and applications are usually implemented on one or more servers or application platforms. A subscriber (or user) in a service provider's network accesses communication services via an access terminal ("AT"), such as a cellular or wireless telephone, pager, or appropriately equipped wireless or wireline portable computer, for instance. A user will typically first register with one or more services or applications via the access terminal prior to using the services. More specifically, an AT will execute a software program referred to as a "user agent" (or "UA") that acts on behalf of the user of the AT in order to, among other functions, register with and invoke the one or more services. In order to simplify the registration process, as well as improve efficiency by reducing registration-related traffic, the IMS network includes a functional element that receives registration requests on a "front end" from users and routes those requests to the appropriate services on the "back end." In the IMS network, this functional element is called a "Call Session Control Function" ("CSCF"), or more precisely, a "Serving" CSCF (or "S-CSCF"), as described below. A given UA's registration requests may thus be channeled to the proper server or application platform via the S-CSCF, alleviating the need for the UA to directly and separately register with each service.

Overview

With the advent of wireless broadband data, numerous devices such as smart phones will be connected to the IMS network 24 hours a day. IMS resources may be allocated for the majority of users all the time even though sessions may be established and released occasionally. The S-CSCF in an IMS network often holds the registration state along with the service profile of the user (including for example, the initial filter criteria) in system memory for the duration of the registration.

Service registration is one of the areas of IMS deployment for which standards are only partially defined. More particularly, while the role of the S-CSCF as a sort of service-registration intermediary has been defined according to various standards, many services expect or require application-specific data to be supplied as part of the registration process, or at least prior using the service. The IMS registration method provides no way to accomplish this other than direct and separate communication between the UA and each such service or application, yielding an approach that thus bypasses the S-CSCF. Consequently, much of the simplicity and efficiency introduced by the S-CSCF-based registration approach is lost when a user registers for a plurality of services, some or all of which require application-specific data.

In an exemplary embodiment, one or more BSCs are configured to register with the IMS network. Each registered BSC may then engage in IMS communications on behalf of the access terminals it serves. To do so, BSCs in a RAN register their respective IP addresses with IMS core. Each BSC then associates data indicating its IP address with the HLR entry of each access terminal that registers with the BSC. By doing so access terminals can engage in IMS services via the BSC, without themselves registering with the IMS core. As such, the IMS core may effectively serve the access terminals without reserving resources (i.e., such as resources of the S-CSCF) for each access terminal individually. Instead, resources may be reserved for the BSC serving those access terminals, which may reduce the amount of resources required to serve those access terminals.

In one aspect, an exemplary method may be carried out by a radio access network (RAN) that provides service in at least one coverage area, and may involve: (a) a first RAN component sending a registration message to an IMS network in order to register the first RAN component with the IMS network, wherein the IMS registration message provides an IP address at which to register the first RAN component; (b) the first RAN component receiving a service request from a first access terminal, wherein the first RAN component is a serving RAN component for the first access terminal; and (c) in response to receiving the service request, the first RAN component engaging in an IMS service on behalf of the first access terminal, wherein engaging in the IMS service on behalf of the first access terminal comprises sending the IMS network a first initiation message for a session event, wherein the first initiation message comprises: (i) a field that identifies the first access terminal and (ii) a field that includes an IP address of a second RAN component that serves a target access terminal.

In another aspect, an exemplary system may include a non-transitory computer-readable medium and program instructions stored on the non-transitory computer-readable medium and executable by at least one processor to: (a) cause a first RAN component to send a registration message to an IMS network in order to register the first RAN component with the IMS network, wherein the IMS registration message provides an IP address at which to register the first RAN component; (b) receive a service request from a first access terminal, wherein the first RAN component is a serving RAN component for the first access terminal; and (c) in response to the service request, cause the first RAN component to engage in an IMS service on behalf of the first access terminal, wherein engaging in the IMS service on behalf of the first access terminal comprises sending the IMS network a first initiation message for a session event, wherein the first initiation message comprises: (i) a field that identifies the first access terminal and (ii) a field that includes an IP address of a second RAN component that serves a target access terminal.

In yet another aspect, an exemplary method may be carried out by an IMS network, and may involve the IMS network: (a) receiving a registration message from each of one or more RAN components, wherein the registration message indicates an IP address of the respective RAN component; (b) receiving from a first RAN component a first initiation message for a session event, wherein the first initiation message indicates an IMS service or application for which initiation of a session event is desired, and wherein the first initiation message comprises: (i) a field that identifies a target access terminal and (ii) a field that includes an IP address of a second RAN component that serves the target access terminal; and (c) in response to the first initiation message, the IMS network initiating the session event, wherein initiating the session event comprises sending a second initiation message to the IP address of the second RAN component, wherein the second initiation message comprises a field that that identifies the target access terminal.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 5 is a table illustrating a portion of a database in home location register, according to exemplary embodiment;

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

According to an exemplary embodiment, base station controllers (BSCs) in a radio access network (RAN) register with an IP Multimedia Subsystem (IMS) core (which is also referred to herein as an IMS network). Each BSC can then access IMS services and applications on behalf of the access terminals that it serves. When an entity registers with an IMS core, the IMS core typically reserves resources for that entity. Thus, when a BSC registers with an IMS core on behalf of the access terminals it serves, this can potentially reduce the amount of resources that are reserved by the IMS core, as compared to the scenario where each access terminal registers with the IMS core, and the IMS core thus reserves resources for each access terminal individually.

I. Exemplary Network Architecture

Figure 1:
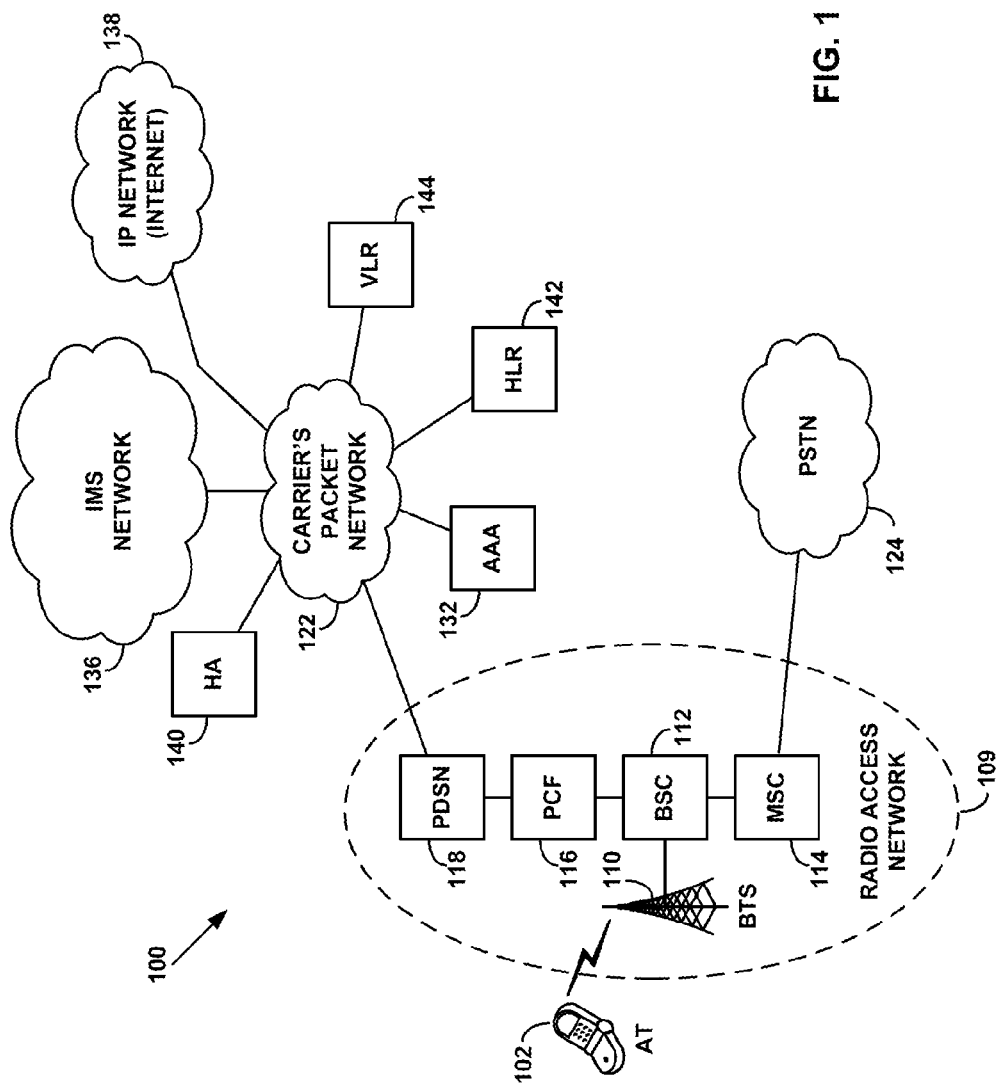
FIG. 1 is a block diagram that illustrates an exemplary telecommunication network in which an exemplary embodiment may be implemented.

FIG. 1 is a block diagram that illustrates an exemplary telecommunication network in which an exemplary embodiment may be implemented. Telecommunication network 100 may be taken as representing a 3G network and includes, by way of example, network elements and components suitable for supporting both circuit-based telecommunication services, such cellular and landline voice calls, and IMS-based packet-based data communication services, such as web browsing, VoIP, voicemail, and e-mail communication.

Example network 100 includes a radio access network (RAN) 109, which may allow subscribers to engage in telecommunication services such as voice telephony, and/or in data communications. RAN 109 is coupled, in turn, with one or more transport networks, such as the public switched telephone network (PSTN) 124 and the packet network 122. Further, packet network 122 is connected to the carrier's IMS network 136, and also to external IP network 138 (e.g., the public Internet).

As noted above, exemplary network 100 also includes packet network 122, which may be a part of or separate from a service provider's core network, a separate virtual network overlaid on a service provider's core network, or some combination of both. Other arrangements are possible as well. Packet network 122 may provide packet-data transport and services to users and to network servers and other network entities that require packet-data communications. In an exemplary system, packet network 122 is an IP network, capable of transporting IP-based service, such as web browsing, VoIP, and the like. The services themselves are based on and delivered from the IMS network 136, which is described below in connection with FIG. 2.

Users may access features and services of network 100 via one or more access terminals or client stations, exemplified in FIG. 1 by client access devices 102, 104, 106, and 108. Each illustrates by way of example a different mode and technology of network access, as well as a different form of client station. For example, access terminal 102 represents a 3G cellular phone, or wireless communication device, that may support both circuit-cellular and packet-data communications using CDMA and/or GPRS/GSM cellular radio access technologies, for instance.

It should be noted that while the term "access terminal" customarily refers to a wireless communication device operating in a wireless communication system, in the context of IMS services and the like that are available in a 3G (or later generation) network, an access terminal is not necessarily limited to being a wireless communication device. As described below, client stations may use wireless or wireline technologies to connect to and access network transport and services. Thus, although wireless access technologies have been important drivers in the development of IMS services, and access terminals are generally considered as being client devices in wireless networks, the term "access terminal" or "AT" used here does not exclude wireline client devices, except to the extent that a particular function or service would only apply to or make sense for wireless access.

Client stations preferably gain access to network 100 via one or more of the connected access networks, each of which comprises at least one switch, router, or similar entity that includes one or more interfaces to network 100. For example, cellular radio access to network 100 by wireless devices, such as exemplary access terminal 102, is provided by RAN 109. As illustrated in FIG. 1, RAN 109 comprises base transceiver station (BTS) 110 connected to the network via base station controller (BSC) 112, which in turn is connected both to the circuit-cellular network via MSC 114, and to the packet-data network via PDSN 118, by way of packet control function (PCF) 116. PDSN 118 also includes a connection to core network 120.

In typical operation of RAN 109, BTS 110 provides an air interface link to access terminal 102 (or similar device), while BSC 112 controls BTS 110, for example assigning specific air interface channels and managing mobility of access terminal 102 across possibly multiple BTSs under its control. Both circuit-cellular and packet data services may be supported according to well-known standards, including IS-2000 and IS-856, for example, both of which may be considered as part of a CDMA family of protocols. For circuit-cellular services, such as circuit-based telephony, communications are then routed between BSC 112 and MSC 114, which in turn provides connectivity to core network 120, to one or more other MSCs or circuit telephony switches (either directly or via core network 120), or to PSTN 124 via digital trunks or similar links to a switch or switches in the PSTN. For packet-data services, such as web browsing and IP multi-media services, communications are instead routed between BSC 112 and IMS network 136 via packet network 122, by way of PCF 116 and PDSN 118.

More specifically, for data services, access terminal 102 (or similar cellular wireless device) will first establish a packet-data session in packet network 122 via PCF 116 and PDSN 118. The packet-data session provides the access terminal an IP address and establishes a point of contact for IP communications with it. In exemplary operation, PDSN 118 in RAN 109 may receive an origination message from access terminal 102 (via BTS 110, BSC 112, and PCF 116), seeking to establish a packet-data session. Upon authentication and authorization of the user-subscriber via a query to AAA server 132, PDSN 118 may then grant the request. Exemplary packet data sessions could include a point-to-point protocol (PPP) session between access terminal 102 (or similar device) and the PDSN 118, and a mobile Internet Protocol (Mobile IP) session between access terminal 102 and a Mobile IP home agent (HA) 140. In response, PDSN 118 may negotiate with the access terminal 102 to establish a data-link layer connection, and PDSN 118 or HA 140 may assign an IP address for the access terminal 102 to use in communications in the packet network 122. A packet data session is thus established and packet data communications to and from access terminal 102 may then flow through the PDSN 118 during the session.

In a further aspect, when an access terminal enters a first wireless coverage area, some combination of the first wireless coverage area's serving BTS, base station controller, and/or the access terminal itself, may determine that the first wireless coverage area should offer service to the access terminal. If so, the access terminal may register with the first wireless coverage area. Typically, this involves the access terminal attaching to the first wireless coverage area, and being assigned forward direction and reverse direction channels for signaling and/or bearer traffic. Once registered, a location register, such as a home location register (HLR) 142, a visitor location register (VLR) 144, or both, can maintain a record of the access terminal's registration status, including an indication that the access terminal is registered with the first wireless coverage area. HLR 142 and/or VLR 144 may each comprise one or more databases containing information regarding each access terminal that is authorized to use RAN 109. Further, the one or more databases of each location register may be distributed and located at different locations of RAN 102.

The information contained at HLR 142 and/or VLR 144 may include identification numbers associated with the access terminals, such as a mobile identification number (MIN), an electronic serial number (ESN), an international mobile subscriber identity (IMSI) number, or some other number. The information contained at HLR 142 and/or VLR 144 may also include routing information associated with a route being taken by each access terminal. The routing information may indicate a location where each access terminal is located. Each access terminal may communicate the routing information to a base station via a route-update message. Upon receiving the route-update message, the base station may transmit the route-update message or information contained within the route-update message to BSC 112 for transmission, in turn, to HLR 142.

With a packet-data session established and an IP address assigned, the user of access terminal 102 may then engage in IP communications and multimedia services hosted in or supported by the IMS network 136. Additional details of IMS services and communications are discussed below.

The components of RAN 109 illustrated in FIG. 1 represent functional elements, and although only one of each is shown in the figure, a given deployment may in practice include more than one of any or all them in various configurations. For example, as noted above, a given BSC could control multiple BTSs. Further, an MSC could in turn control multiple BSCs, and a given metropolitan area could include multiple MSCs or even multiple RANs connected via carrier's core network 120 or other interconnecting network, for example. Still further, multiple metropolitan areas, each with a hierarchical arrangement of MSCs, BSCs, and BTSs, or with multiple RANs, for example, could be connected via the carrier's backbone network (e.g., core network 120). Similar arrangements of one-to-many are also possible for PDSNs-to-BSCs as well, as are other configurations. The above examples are not mean to be exhaustive or limiting.

Additionally, each functional element of RAN 109 may be implemented as a separate physical entity, or various combinations of them may be integrated into one or more physical platforms. For example, BTS 110 and BSC 112 may be implemented in a single physical device. Similarly, PCF 116 and PDSN 118 could be combined on a single platform. Other physical configurations of the functional elements of the RAN may also be realized.

Figure 2:
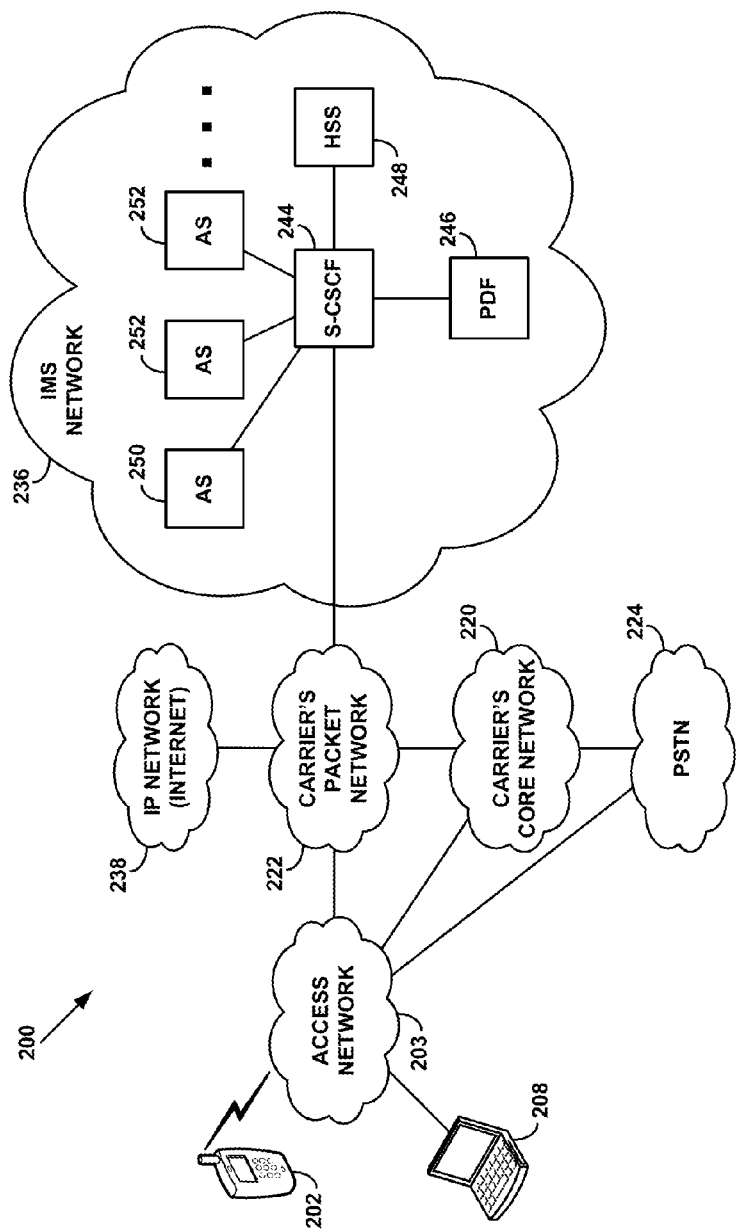
FIG. 2 is a block diagram that provides an alternate representation of the exemplary telecommunication network shown in FIG. 1.

An alternate representation of network 100 is shown in FIG. 2 as network 200. The IMS network, which is relabeled in FIG. 2 as IMS network 236, is expanded to illustrate aspects related to service delivery and relevant to the discussion of aggregate service registration. It will be appreciated that IMS network 236 remains a simplified view of an IMS architecture that resembles similar architectures developed under the auspices of 3GPP or 3GPP2, for example. Certain aspects of IMS network 236 represent and/or support improvements in delivery of services, as well as in the ability of a network operator to introduce new services, as described below. As an additional, minor difference between the two figures, two client devices, access terminal 202 and PC 208, are shown in network 200.

In FIG. 2, IMS network 236 is seen to comprise a Serving Call Session Control Function (S-CSCF) 244 as a connecting element to network 222. Communications over this connection may include signaling and call control between external networks and IMS network 236, for instance. In particular, services in the 3G IMS network are based largely on SIP signaling and call control (among other protocols), and the CSCF typically incorporates the functions of a SIP proxy (and/or registrar) server into a framework suited for wireless user mobility.

As shown, S-CSCF 244 is also connected to "Home Subscriber Server" ("HSS") 248, a database that stores user profiles that enumerate and/or define privileges of individual users, including the services to which they are entitled or to which they have subscribed. The S-CSCF is additionally connected to application servers (ASs) 250, 252, and 254, all of which are components of the IMS network. The ellipses to the right of AS 254 are meant to indicate that there could be additional application servers in the IMS network, each of which could be communicatively connected to the S-CSCF.

The application servers are the IMS components that actually host many of the services and applications of the network. Thus, while much of the other infrastructure of the IMS (and more generally, the 3G) network supports signaling and control of services, as well transport of media, many of the services themselves are implemented as programs or applications on the application and media servers. It will be appreciated that some services, such as peer-to-peer VoIP calls, may involve only signaling and media transport without any additional AS- or MS-based service components. However, IMS services are more generally considered to include server-based components, and one of the aims of the IMS architecture is to simplify the expansion of IMS service offerings. Examples of such services include presence, "Push-to-Talk," and interactive, location-based applications.

The intermediary role of the S-CSCF and the use of standard communication interfaces between the S-CSCF and the application servers (as depicted in IMS network 236) accommodate a predictable and systematic approach to service expansion. Further, as an integration point in the IMS network for new and expanded services, the S-CSCF not only serves as an intermediary for service requests, but also advantageously acts a gateway between these servers and other support elements of the IMS (and more generally, the 3G) network. As such, the S-CSCF can facilitate the isolation and protection of sensitive network components, including, for instance, the HSS and even supporting sub-networks, from application servers that may need to access them but may lack appropriate interfaces and/or sufficient levels of trust.

Continuing with the description of IMS network 236, S-CSCF 244 is also connected to PDF 246. Interaction between S-CSCF 244 and PDF 246, which could be based on COPS, for instance, helps the IMS coordinate resource allocation when multiple services are invoked or requested by a user. Note in its role as a service gateway, the S-CSCF can provide intermediary communications between application servers and the PDF, and the HSS, among other elements of the IMS network.

Although not shown in this illustration, PDF 246 can be connected to Policy Enforcement Points (PEPs) within or associated with resource-allocating elements, such as border router, a PDSN, and/or a media gateway (MGW). Each of these network elements—the PDSN, border router, and media gateway—represents network resources that could be required to support one or more IMS-based services. Each PEP acts as a sort of agent, monitoring and controlling resource allocation of its host element (e.g., border router, PDSN, MGW, etc.) under the direction of the PDF.

An entity may request an IMS service by issuing a SIP INVITE or other SIP message from a client device, such as access terminal 202, to S-CSCF 244. In practice, S-CSCF 244 may be one of three separate CSCFs that act together to support user mobility. Specifically, access terminal 202 may register via a proxy CSCF (P-CSCF), which becomes a first point of contact for SIP messages to and from the client device. The P-CSCF then communicates with an interrogating CSCF (I-CSCF), which in turn communicates with the user's home or serving CSCF (S-CSCF). The user actually registers with the S-CSCF, which then processes the user's subsequent service requests. The P-CSCF provides a local signaling contact point when the user is "away from home," while the I-CSCF acts as a sort of signaling gatekeeper between the P-CSCF and S-CSCF when they reside in different networks, for example. Through their collective actions, the three CSCFs process and route SIP (or other) signaling messages on behalf of a user, and in the service of establishing media sessions.

In the context of the present discussion, only the S-CSCF is considered (and shown in FIG. 2), because it is typically the S-CSCF that communicates with the application and services via the servers and platform that host them. Thus, while a user's service requests will generally traverse a P-CSCF and I-CSCF before arriving at the user's S-CSCF, processing of those requests and communication with the services themselves is handled by the S-CSCF. Consequently, there is no loss of generality with respect to the present invention in depicting just a single S-CSCF 244, as in FIG. 2. Further, it is possible for a single CSCF to incorporate the functions of all three CSCFs, acting as one or another depending on the specific communication being processed. Note that if the user is already in his or her home network, then only the S-CSCF may be involved in any case. It will be appreciated that the arrangement of CSCFs described above is exemplary, and other signaling architectures could be used as well without limiting the scope or spirit of the present invention.

In both FIGS. 1 and 2, the depiction of (generally) just one of each network element in networks 100 and 200 is illustrative, and there could be more than one of any of them, as well as other types of elements not shown. The particular arrangement shown in FIGS. 1 and 2 should not be viewed as limiting with respect to the present invention. Further, the network components that make up a communication system such as network 200 or network 200 are typically implemented as a combination of one or more integrated and/or distributed platforms, each comprising one or more general purpose and/or special purpose computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more general purpose and/or special purpose computer processors to carry out the network-side functions, steps, and procedures of the various embodiments of the present invention described herein. Similarly, exemplary client access devices, such as access terminal 202 and/or PC 208, may include a user-interface, I/O components, a communication interface, a processing unit, and data storage, all of which may be coupled together by a system bus or other mechanism. Such a device also typically comprises software or firmware stored in the data storage and executable by the processing unit to carry out client-side functions, steps, and procedures of the various embodiments of the present invention described herein. As such, networks 100 and 200, and exemplary client access devices, such as access terminal 202 and/or PC 208, collectively are representative of example means of implementing and carrying out the various functions, steps, and procedures described herein.

In many (if not all) cases, a user must register with a service or application before invoking or accessing that service. Service registration in the IMS network involves user registration with an S-CSCF, and subsequent notification to services of the registration. When a user registers in the IMS network, S-CSCF 244 will send a request to HSS 248 for the user's profile. The request may also involve some form of user authentication and authorization as well. Through the user profile, the S-CSCF may determine the services to which a user has subscribed, and how to handle calls and other media sessions involving the user. As the user's registrar, the S-CSCF also becomes a point of contact (possibly by way of a P-CSCF) for other users and services involved in SIP-based communications with the user.

In accordance with standards and recommended best practices for IMS services deployment, the S-CSCF does not actually forward or route user registration requests to the services or applications being requested. Rather, services and applications first "subscribe" to registration "events" at the S-CSCF, and the S-CSCF in turn "notifies" services and applications when it receives registration requests. Specifically, IMS service and application registration uses the SIP SUBSCRIBE/NOTIFY mechanism, whereby a particular service (or application) sends a SIP SUBSCRIBE message to the S-CSCF in order to establish a standing request to be alerted when the S-CSCF receives registration requests.

In response to receiving the SUBSCRIBE message from a particular service, the S-CSCF thereafter alerts the particular service when the S-CSCF receives registration requests from users (i.e., from their user agents). More specifically, the SUBSCRIBE message includes information indicative of the subscribing entity, such as a network address, so that the S-CSCF knows who or what has subscribed, and how to contact the subscribing entity. Consequently, when the S-CSCF receives a SIP REGISTER message the S-CSCF sends a SIP NOTIFY message to the particular service using the contact information supplied in the SUBSCRIBE message. Note that the S-CSCF may first determine if the user is authorized to register for services by consulting the user's profile for instance. The NOTIFY message includes an identity of the user that issued the registration request (SIP REGISTER message), so that the particular service knows who (or what) has registered. Thus, receipt of the SIP NOTIFY message at the service (or application) effectively registers the identified user with the particular service, by virtue of the identified user having registered via the S-CSCF. Use of this registration mechanism for all IMS services establishes a simple, efficient, and uniform approach not only to service registration, but to quick and reliable integration of new services and applications as they are developed or become available.

II. Exemplary System Components

Figure 3:
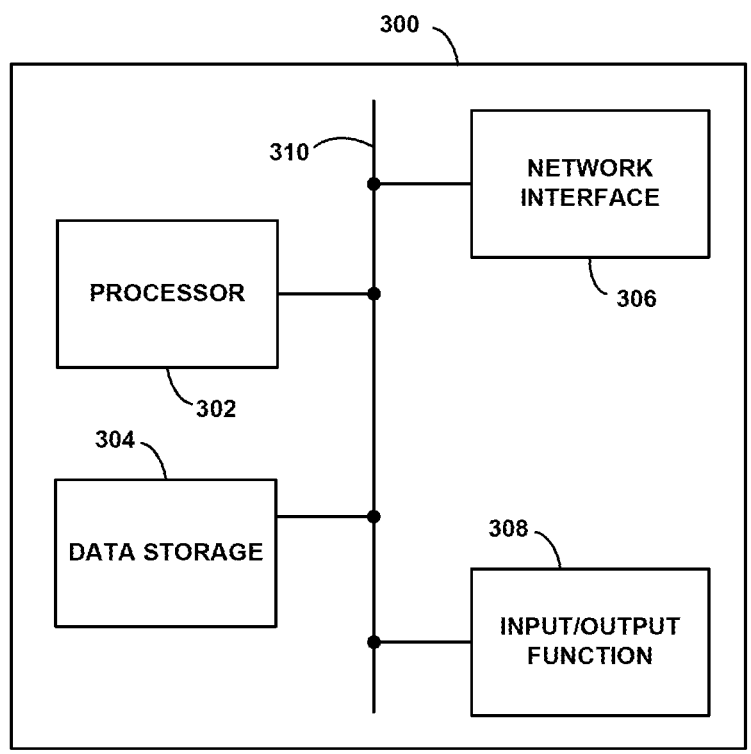
FIG. 3 is a block diagram of a system component, according to an exemplary embodiment.

FIG. 3 is a block diagram of a system component, according to an exemplary embodiment. An exemplary system component 300 may take the form of a RAN component, such as a BTS, a BSC, and/or an MSC. Further, an exemplary system may in fact include multiple RAN components that combine to provide the functionality described herein. Yet further, an exemplary system may be just a part of or a subsystem of a RAN component. For instance, in a basic embodiment, an exemplary system may take the form of a non-transitory computer readable medium having program instructions stored thereon that are executable to provide the RAN-component functionality that is described herein.

In other embodiments, exemplary system component 300 may take the form of an IMS component, or one or more IMS components, which make up the IMS network (e.g., an S-CSCF, an HSS, and/or an AS). Further, an exemplary system may be a part of or a subsystem of an IMS component 300. For instance, in a basic embodiment, an exemplary system may take the form of a non-transitory computer readable medium having program instructions stored thereon that are executable to provide the IMS-component functionality that is described herein.

System component 300 preferably includes at least one processor 302, a data storage 304 (i.e., a non-transitory tangible computer-readable medium), a network interface 306, and an input/output function 308, all of which may be coupled together by a system bus 310 or a similar mechanism. Processor 302 preferably includes one or more CPUs, such as one or more general purpose processors and/or one or more dedicated processors (e.g., application specific integrated circuits (ASICs) or digital signal processors (DSPs), etc.).

Data storage 304, in turn, may comprise volatile and/or non-volatile memory and can be integrated in whole or in part with processor 302. Data storage 304 preferably holds program instructions, executable by processor 302, and data that is manipulated by these instructions to carry out the various methods, processes, or functions described herein. Alternatively, these methods, processes, or functions can be defined by hardware, firmware, and/or any combination of hardware, firmware and software. By way of example, the data in data storage 304 may contain program instructions executable by processor 302 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

III. Exemplary Message Flow Between BSCs and IMS Servers

Figure 4A:
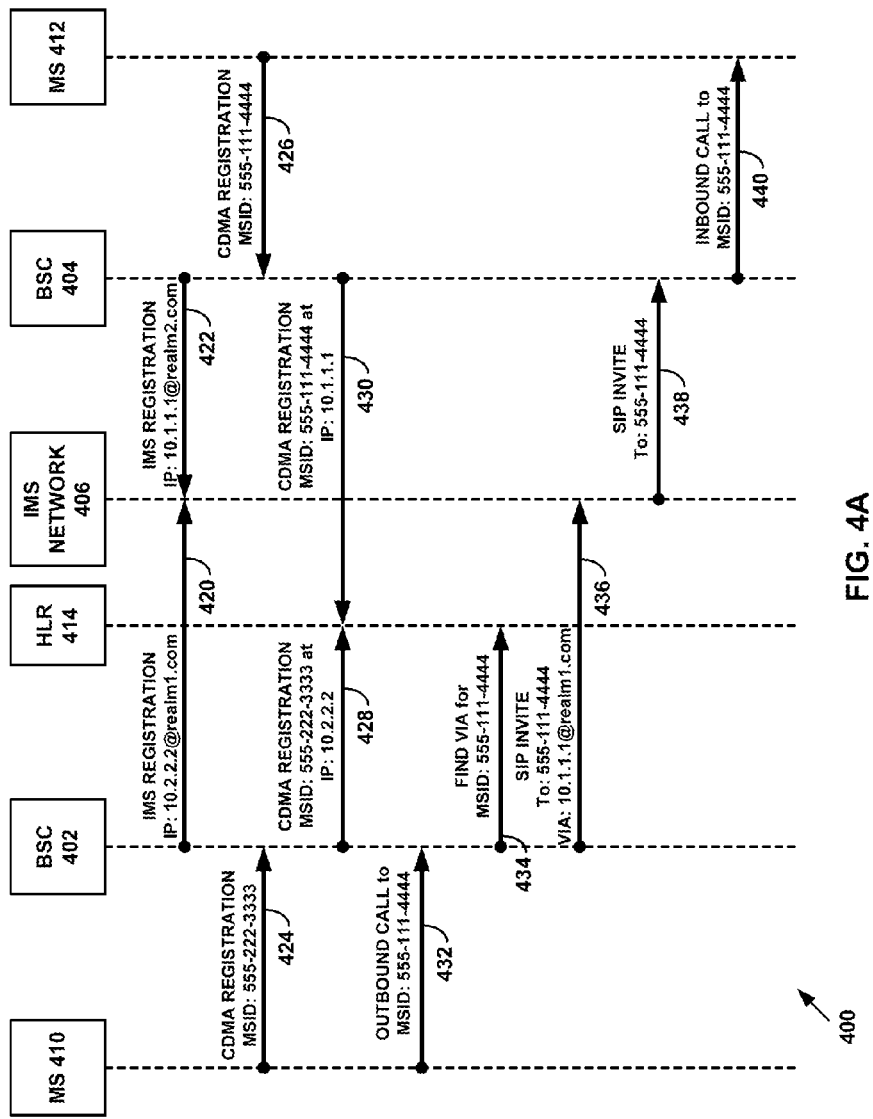
FIG. 4A is a simplified message-flow diagram illustrating messaging between a radio access network and an IP multimedia subsystem network, according to an exemplary embodiment.

FIG. 4A is a simplified message-flow diagram 400 illustrating messaging between a RAN and an IMS network, according to an exemplary embodiment. In particular, FIG. 4A illustrates messaging between BSCs 402 and 404, an IMS Core 406, access terminals 410 and 412, and an HLR 414. The message-flow diagram 400 illustrates, at least in part, messaging that may be involved in: (i) BSC registration with the IMS Core 406, as shown by messages 420-422, (ii) mobile-station registration with a RAN, as shown by messages 424-430, and (iii) a call between two access terminals that uses IMS services, as shown by messages 432-440.

As shown, to provide IMS services to access terminals, both BSC 402 and BSC 404 register with IMS core 406. To do so, BSC 402 sends an IMS registration message 420 to IMS core 406. The IMS registration message 420 includes data indicating the IP address of the BSC. In this example, the IP address of BSC 402 is "10.2.2.2@realm1.com", and registration message 420 thus indicates as such. Similarly, BSC 404 sends an IMS registration message 422 to IMS core 406. The IMS registration message 422 also includes data indicating the IP address of the BSC, which in this example is "10.1.1.1@realm2.com" for BSC 404.

When IMS core 406 receives the IMS registration messages 420 and 422 from BSCs 402 and 404, respectively, the IMS core will set up resources to provide the BSCs with IMS services. The resources may be reserved for the BSC using any of the well-known techniques for reserving resources for clients in IMS systems. Since the IMS core is typically not aware of individual access terminals (i.e., it does not know their IP addresses, mobile station identifiers (MSIDs), etc.), IMS-based communications between access terminals will effectively take place between the BSCs serving the respective access terminals (or via the serving BSC, if both access terminals are served by the same BSC), which send and receive communications to each other via the IMS core, and then forward communications to the access terminal that they serve. As a result, the routing of data to individual access terminals may be handled by the BSCs in a RAN.

To facilitate routing of IMS communications to individual access terminals, exemplary BSCs may be configured to store records associating their respective IP addresses with the access terminals that they respectively serve. As such, a BSC 402 that receives an outbound call from an access terminal 410 to another access terminal 412 may lookup the IP address of the BSC 404 that is serving the other access terminal 412, so that IMS can be used to communicate with the other BSC 404.

More specifically, when BSC 402 receives a CDMA registration message 424 from access terminal 410, BSC 402 proceeds to register access terminal 410 by sending a CDMA registration message 428 to HLR 414. BSC 402 includes data in CDMA registration message 428 that indicates, for example: (a) the MSID of the access terminal that is being registered (e.g., (e.g., the access terminal's 7- or 10-digit phone number, such as "555-222-3333"), and (b) the BSC's own IP address (e.g., "10.2.2.2@realm1.com"). As such, a record associating the IP address of a given BSC with a given access terminal that the BSC serves may be stored in the HLR.

Note that while the message flow 400 involves CDMA (e.g., CDMA registration messages from access terminals), exemplary methods and systems may provide IMS services to access terminals operating under other communication protocols as well. For example, IMS services may be provided for access terminals operating under other non-IP-based protocols such as GSM, PSPM, and so on. Accordingly, an exemplary embodiment may involve registration messages as specified by various other non-IP-based protocols in addition, or in the alternative, to the CDMA registration messages shown in FIG. 4A.

Referring again to FIG. 4A, when HLR 414 receives CDMA registration message 428, HLR 414 may then create an data entry (or update an existing data entry) for the access terminal 410. In particular, HLR 414 may create or update the data entry to associate the MSID of access terminal 410 with the base-station identifier (BSID) of BSC 402. Further, HLR 414 may store data indicating the IP address of BSC 402. Similarly, when BSC 404 receives a CDMA registration message 426 from access terminal 412, BSC 404 proceeds to register access terminal 412 by sending a CDMA registration message 430 to HLR 414, which in turn: (a) creates or updates an entry to associate the MSID of access terminal 412 with the BSID of BSC 404 and (b) stores data indicating the IP address of BSC 404.

FIG. 5 is a table 500 illustrating a portion of a database in HLR 414, according to exemplary embodiment. More specifically, table 500 indicates, for each of a number of MSIDs 502, the BSID 504 of the BSC with which the associated access terminal is registered, as well as the IP address 506 associated with the respective BSC. As shown, table 500 includes an entry A that may have been generated in HLR 414 for access terminal 410 upon receipt of CDMA registration message 428, as well as an entry B that may have been generated in HLR 414 for access terminal 412 upon receipt of CDMA registration message 430. Specifically, entry A associates the MSID for access terminal 410 ("555-222-3333") with the BSID of BSC 402 and the IP Address of BSC 402 ("10.2.2.2@realm1.com"). Likewise, entry B associates the MSID for access terminal 412 ("555-111-4444") with the BSID of BSC 404 and the IP Address of BSC 404 ("10.1.1.1@realm2.com").

The representation of table 500 as including entries A-N represents the flexible size of the database, according to an exemplary embodiment. However, it should be understood that the number of entries in an HLR database, such as that illustrated by table 500, may vary over time according to the number of access terminals operating in the RAN. Further, it should be understood that table 500 is provided for purposes of example, and that the structure and content of entries in an HLR database and/or of the database itself may vary as a matter of engineering design choice.

Referring back to FIG. 4A, access terminal 410 may initiate a call to access terminal 412. In particular, access terminal 412 may send an outbound call message 432 to BSC 402, which indicates the MSID of the target access terminal (i.e., "555-111-4444"). Note that in an exemplary embodiment, the access terminal may be unaware that an IMS service, such as a VoIP service, is being used to handle its call. In particular, when BSC 402 receives outbound call message 432, it may determine that VoIP should be used for the call, instead of a standard CDMA voice call (e.g., a call under the IS-2000 protocol). This may be automatic for all calls, or may be done for only calls. In an embodiment, where some standard CDMA calls are handled using VoIP (or another IMS service), and others are not, the decision regarding which calls should be handled with VoIP may be based on various criteria, which may be selected as a matter of engineering design choice. Further, in an alternative embodiment, it is also possible that access terminal 410 may specifically request or indicate that the BSC 402 should use an IMS service for a call. For instance, an indication of whether or not to use an IMS service, or an indication of a specific type of IMS service or application to be used, may be included in outbound call message 432.

Upon receipt of outbound call message 432, BSC 402 may look up the IP address for the BSC that is serving the target access terminal (i.e., the intended recipient of the call). More specifically, BSC 402 may send a "find via" message 434 to HLR 414, in which a MSID field is set to "555-111-4444" (i.e., the MSID of the target access terminal). The HLR may be configured to respond to the find via message 434 by looking up the serving BSC for the identified MS, determining the IP address of this BSC, and replying to BSC 402 with an indication of the IP address, and possibly other information as well. Provided with this information, the BSC 402 may determine that the IP address of the BSC that is serving access terminal 412 (i.e., BSC 404) is "10.1.1.1@realm2.com".

Once BSC 402 has determined the IP address of the BSC serving the target access terminal (e.g., BSC 404), BSC 402 may initiate the call on behalf of access terminal 410 by sending a SIP invite 436 to IMS core 406. Since the IMS core 406 may not have any record of access terminal 412, and thus does not have a way to forward the SIP INVITE to access terminal, BSC 402 directs the SIP INVITE 436 to the IP address of the BSC 404 serving access terminal 412. To do so, an exemplary SIP INVITE may include a "VIA" header, which indicates to the IMS network, the IP address of the user entity to receive the SIP INVITE, which in an exemplary embodiment, is typically a BSC that has registered with the IMS network. For example, SIP INVITE 436 includes a "VIA" header that is set to the IP address of the serving BSC 404 (e.g., "10.1.1.1@realm2.com"). Thus, based on the VIA header of SIP INVITE 436, IMS core 406 forwards a SIP INVITE 438 to BSC 404.

It should be understood that the VIA header is but one example of how a BSC may indicate the IP address of another BSC. As such, a BSC may use various techniques to indicate the IP address of the BSC that is the intended recipient of a message sent via an IMS network. In general, a SIP INVITE, or any other type of message sent by a BSC to an IMS network, may indicate the IP address of the recipient BSC in any manner, without departing from the scope of the invention. Furthermore, in an embodiment where a BSC facilitates an IMS service or application for a single access terminal, such as an embodiment illustrated by FIG. 4B for instance, the BSC may not need to provide a VIA header, as communications from the IMS application server may all be handled by the serving BSC. In such an embodiment, the serving BSC may alternatively indicate its own IP address. Other variations are also possible.

In a further aspect, a message from a BSC to an IMS server may also include a "TO" header, which identifies the target access terminal that is ultimately a recipient of the IMS service. Thus, as shown, SIP INVITE 436 includes a TO header that is set to the MSID of the target access terminal 412 for the call ("555-111-4444"). Since the target access terminal 412 is not registered with the IMS core 406, the IMS core typically is unable to send a SIP INVITE directly to the target access terminal 412. However, IMS core 406 is preferably configured to include the TO field in the SIP INVITE 438, which IMS core 406 sends to BSC 404 upon receipt of SIP INVITE 436.

Provided with the TO field indicating the MSID "555-111-4444", BSC 404 knows that SIP INVITE 438 is an incoming call for access terminal 412. Accordingly, BSC 404 may send an inbound call message to access terminal 412, thus notifying access terminal 412 that an inbound call has been received for access terminal 412, and thus can be accepted or denied by access terminal 412.

It should be understood that while access terminals 410 and 412 are served by different access terminals in FIG. 4A, it is within the scope of the invention that a given BSC may engage in an IMS application or service on behalf of two or more access terminals that are both served by the given BSC. Further, while FIG. 4A illustrates an embodiment in which the BSCs engage in IMS service that involves two or more clients, such as a VoIP call, it is possible that other embodiments may involve IMS services or applications in which only one client is involved.

Figure 4B:
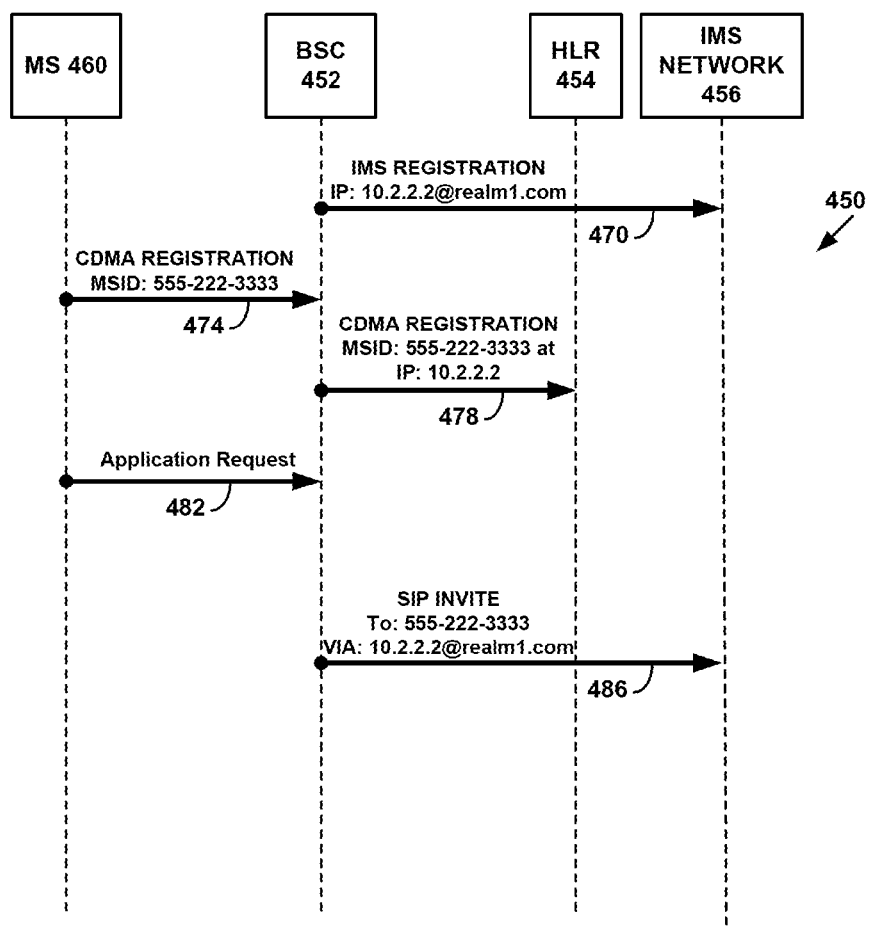
FIG. 4B is another simplified message-flow diagram illustrating messaging between a radio access network and an IP multimedia subsystem network, according to an exemplary embodiment.

FIG. 4B is a simplified message-flow diagram 450 illustrating messaging between a RAN and an IMS network, according to an exemplary embodiment in which a BSC engages in an IMS service for a single client. In particular, FIG. 4B illustrates messaging between a BSC 452, an IMS Network 456, a access terminal 460, and an HLR 464. The message-flow diagram 450 illustrates, at least in part, messaging that may be involved in: (i) registration of BSC 452 with the IMS Network 456, as shown by message 470, (ii) registration of access terminal 460 with the RAN, as shown by messages 474 and 478, and (iii) setup of an IMS service for access terminal 460 by BSC 452, as shown by message 482 and 486.

In order to provide access terminal 460 with an IMS service or application, BSC 452 registers with IMS network 456. To do so, BSC 452 sends an IMS registration message 470 to IMS network 456. The IMS registration message 470 includes data indicating the IP address of the BSC. In this example, the IP address of BSC 452 is "10.2.2.2@realm1.com", and registration message 470 therefore indicates as such. When IMS network 456 receives the registration messages 470 from BSC 452, the IMS network will set up resources to provide BSCs with IMS services.

Further, when BSC 452 receives a CDMA registration message 474 from access terminal 460, BSC 452 may proceed to register access terminal 460 by sending a CDMA registration message 478 to HLR 464. BSC 452 may include data in CDMA registration message 478 that indicates, for example: (a) the MSID of the access terminal that is being registered (e.g., (e.g., the access terminal's 7- or 10-digit phone number, such as "555-222-3333"), and (b) the BSC's own IP address (e.g., "10.2.2.2@realm1.com").

When HLR 464 receives CDMA registration message 478, HLR 464 may then create an data entry (or update an existing data entry) for the access terminal 460. In particular, HLR 464 may create or update the data entry to associate the MSID of access terminal 460 with the BSID of BSC 452. Further, HLR 464 may store data indicating the IP address of BSC 452 and/or associating the IP address with the MSID of access terminal 460.

At some point after registering, access terminal 460 may request that a given service or application be initiated. For example, access terminal 460 may send an application request 482 to BSC 452, which may indicates a certain service or application that the access terminal 460 wishes to access. Upon receipt of the request, BSC 452 may determine, based on the type of application being requested, that the corresponding IMS application need only be provided to the requesting access terminal 460. As such, the BSC 452 may proceed to send SIP INVITE message 486 to the IMS network 456.

In this embodiment, where only one access terminal 460 is involved, BSC 452 may include its own IP address in the VIA header of SIP INVITE message 486, indicating that communications during the session with IMS network 456 should be sent to BSC 452. Further, the TO field may indicate the originating access terminal 460.

V. Exemplary Methods

Exemplary methods may be carried out in a RAN and/or in an IMS network so that a RAN entity, such as a BSC, can engage in IMS services on behalf of a number of access terminals in a manner such as illustrated by data-flow diagrams 400 and/or 450.

Figure 6A:
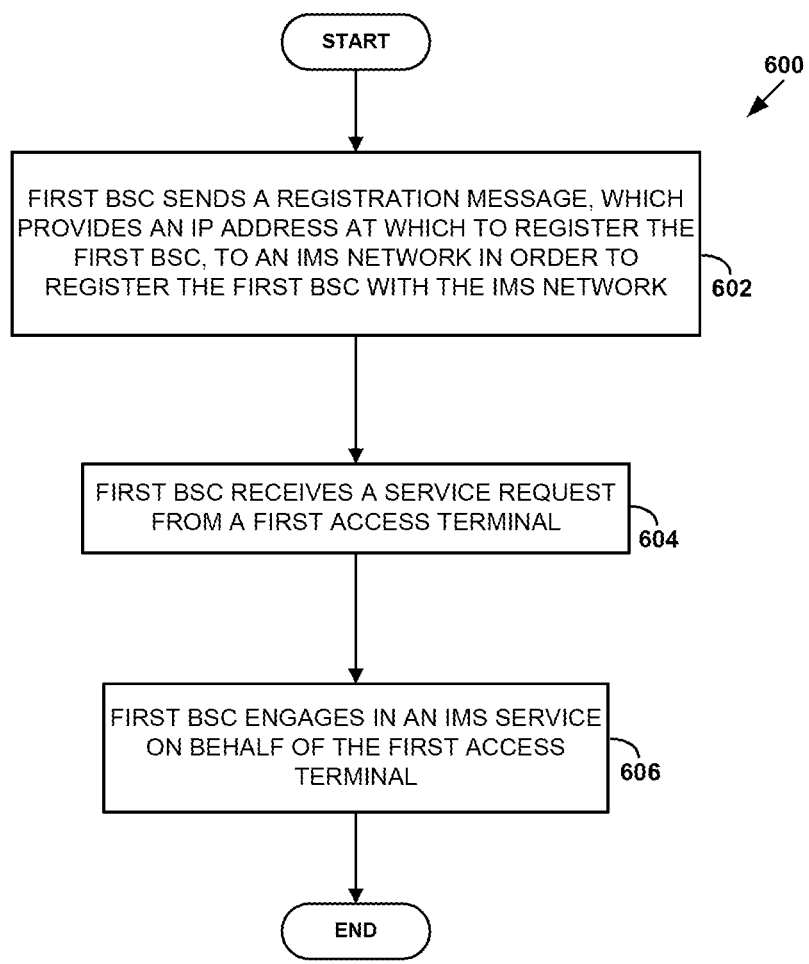
FIG. 6A is a flow chart illustrating a method that may be carried out by a radio access network component, according to an exemplary embodiment.

FIG. 6A is a flow chart illustrating a method 600 that may be carried out by a RAN component, according to an exemplary embodiment. The exemplary method 600 is described by way of example, with reference to the method being carried out by a first BSC. However, it should be understood that exemplary methods may additionally or alternatively be carried out by one or more other RAN components, without departing from the scope of the invention. Method 600 involves a first BSC engaging in an IMS application on behalf of a single access terminal and as such, embodiments of method 600 may involve messaging that is the same as or similar to that shown in FIG. 4B.

More specifically, method 600 involves the first BSC sending a registration message to an IMS network in order to register the first BSC with the IMS network, as shown by block 602. The IMS registration message provides an IP address at which to register the first BSC, and may, for example, be similar to IMS registration message 470. At a later time, the first BSC receives a service request from a first access terminal, as shown by block 604. In response, the first BSC engages in an IMS service on behalf of the first access terminal, as shown by block 606.

In an exemplary embodiment, the service request may take various forms. For example, the service request may be a request for a certain service or application (IMS or non-IMS) such as, for example, application request 482 of FIG. 4B. As another example, the service request may be an outbound call message to initiate a call to another access terminal such as, for example, outbound call message 432 of FIG. 4A. Other examples are also possible.

In an exemplary embodiment, the BSC engages in all communications with the IMS network, such that communication to, from, and via the IMS network are essentially transparent to the first access terminal. For example, to initiate the IMS service on behalf of the first access terminal, the first BSC may send the IMS network a first initiation message for a session event, wherein the first initiation message comprises: (i) a field that identifies the first access terminal and (ii) a field that includes an IP address of a second BSC component that serves a target access terminal. The first initiation message may be, for example, a SIP INVITE such as the SIP INVITE message 486 shown in FIG. 4B. Further, because method 600 involves a BSC engaging in an IMS service for a single access terminal, the first and second BSC are one and the same, and first access terminal is also the target access terminal (as all communications and session data may be routed back to it through the first BSC). Accordingly, a TO field of the SIP INVITE message may identify the first access terminal by indicating the MSID of the first access terminal, and a VIA field may provide the IP address of the first BSC.

In other embodiments, one or more BSCs may engage in a single IMS session event on behalf of two or more base stations. For example, two BSCs may engage in a VoIP call between a first access terminal served by a first BSC, and a second access terminal served by a second BSC. As another example, it is also possible that a single BSC engage in a VoIP call between two access terminals that it serves. Other examples, involving more BSCs, more access terminals, and/or IMS services and applications other than VoIP, are also possible.

Figure 6B:
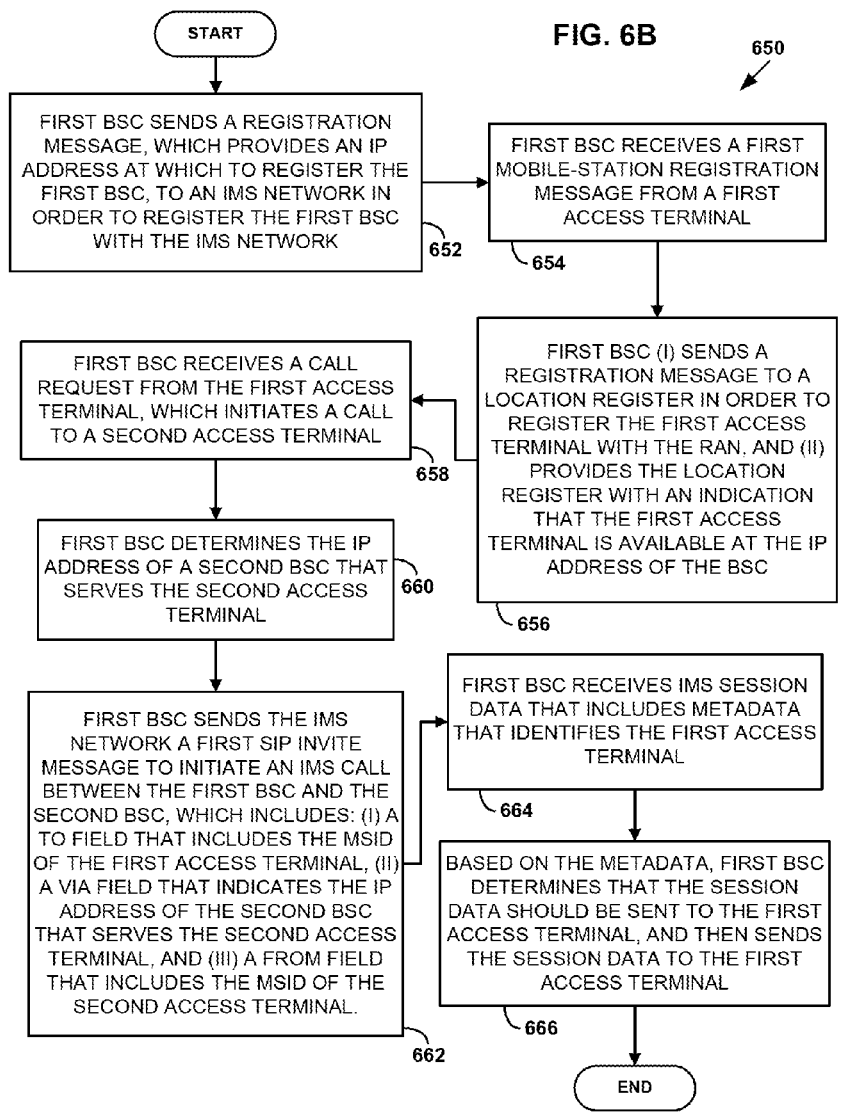
FIG. 6B is another flow chart illustrating a method that may be carried out by a radio access network component, according to an exemplary embodiment.

FIG. 6B is a flow chart illustrating a method 650 that may be carried out by a RAN component, according to an exemplary embodiment. The exemplary method 650 is described by way of example, with reference to the method being carried out by a first BSC, which engages in an IMS service (e.g., a VoIP call) with a second access terminal via a second BSC. Accordingly, embodiments of method 650 may involve messaging that is the same as or similar to that shown in FIG. 4A. It should be understood, however, that exemplary methods may additionally or alternatively be carried out by one or more other RAN components, without departing from the scope of the invention.

More specifically, method 650 involves a first BSC sending a registration message to an IMS network in order to register the first BSC with the IMS network, as shown by block 652. The IMS registration message may include an IP address at which to register the first RAN component, and may, for example, be similar to IMS registration messages 420 and 422 of FIG. 4A. Method 650 also involves the first BSC receiving a first mobile-station registration message from a first access terminal, which registers the first access terminal with the RAN, as shown by block 654. To register the first access terminal, the BSC may send a registration message to a location register, such as an HLR, and also may provide the HLR with an indication that the first access terminal is available at the IP address of the BSC, as shown by block 656.

At some time after it has registered with the IMS network, the first BSC may also receive a call request (e.g., a CDMA call, or any other type of outbound call message) from the first access terminal, which initiates a call to a second access terminal, as shown by block 658. In response, the BSC may determine the IP address of a second BSC that serves the second access terminal, as shown by block 660. To do so, the first BSC may, for example, query the location register for the IP address of the second BSC (assuming that the second BSC, if different from the first BSC, has registered with the location register or with another location register in communication with the location register). The first BSC may then engage in an IMS call service on behalf of the first access terminal.

More specifically, to engage in the IMS call on behalf of the first access terminal, the BSC may send the IMS network a first SIP INVITE message in order to initiate an IMS call between the first BSC and the second BSC, as shown by block 662. As shown in block 662, the SIP INVITE message may include: (i) a TO field that includes the MSID of the first access terminal, (ii) a VIA field that indicates the IP address of the second BSC that serves the second access terminal, and (iii) a FROM field that includes the MSID of the second access terminal. According to an exemplary embodiment, the VIA field may be used by the IMS network for routing purposes, and in particular, to route the SIP INVITE message to the IP address indicated for the second BSC. The TO and FROM fields, however, may effectively be pass-through information, which the IMS network forwards to the second BSC. The second BSC can then use the information in the TO and FROM fields for routing and possibly other purposes.

In particular, the second BSC may determine that the incoming call is intended for the second access terminal based on the TO field. Further, when a response is received from the second access terminal, the FROM field may be used to query the location register for the IP address of the BSC that is serving the first access terminal, so that a response can be sent to the serving BSC via the IMS network. Note that when the second BSC looks is sending the response, the serving BSC may still be the first BSC, or may be a different BSC (if, for example, the access terminal has been handed off to a coverage area served by a different BSC).

Returning to FIG. 6B, the method 650 may further involve, during the session event (e.g., during the IMS call), the first BSC receiving IMS session data (e.g., data comprising voice communications from the second access terminal), as shown by block 664. The session data may include metadata (e.g., a TO field or the equivalent thereof) that identifies the first access terminal. Based on this metadata, the BSC may determine that the session data should be sent to the first access terminal, and may then send the session data to the first access terminal, as shown by block 666.

Figure 7:
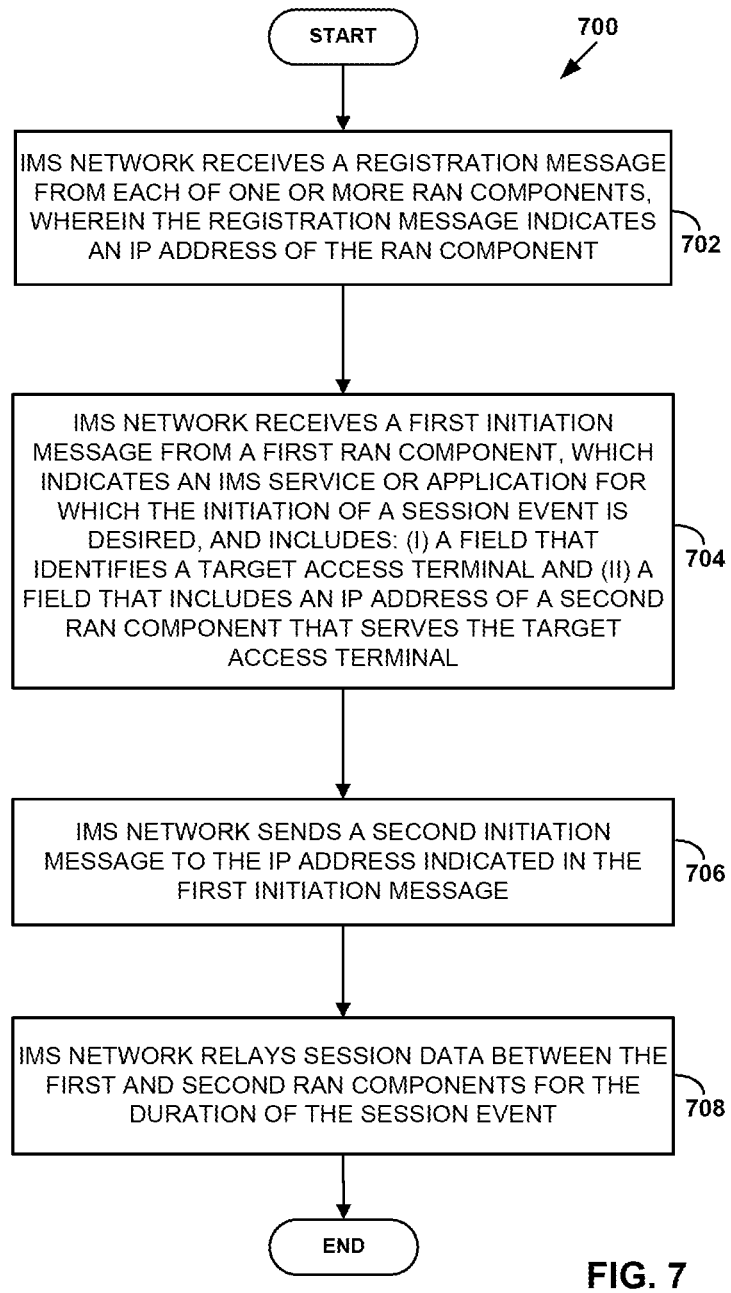
FIG. 7 is a flow chart illustrating a method that may be carried out by an IP multimedia subsystem network, according to an exemplary embodiment.

FIG. 7 is a flow chart illustrating a method 700 that may be carried out by a IMS network, according to an exemplary embodiment. The exemplary method 700 is described by way of example, with reference to the method generally being carried out by the IMS network. However, it should be understood that in practice, such exemplary methods may be carried out by one or more components of an IMS network, without departing from the scope of the invention. Method 700 involves an IMS network facilitating a session event (e.g., a VoIP call) between two RAN components (e.g., two BSCs) that are both engaging in the session event on behalf an access terminal served by the respective BSC. Accordingly, some embodiments of method 700 may involve messaging that is the same as or similar to that shown in FIG. 4A and/or FIG. 4B.

In particular, method 700 involves an IMS network receiving a registration message from each of one or more RAN components, wherein the registration message indicates an IP address of the RAN component, as shown by block 702. The IMS network then receives a first initiation message from a first RAN component, which indicates an IMS service or application for which the initiation of a session event is desired, as shown by block 704. As further shown by block 704, the first initiation message may include: (i) a field that identifies a target access terminal and (ii) a field that includes an IP address of a second RAN component that serves the target access terminal. In response, the IMS network may initiate the session event.

To do so, the IMS network may then send a second initiation message to the IP address indicated in the first initiation message (e.g., the IP address of the second RAN component), as shown by block 706. The second initiation message may include a field that that identifies the target access terminal. Further, after establishing the IMS session event between the first and second RAN components, the IMS network may relay session data between the first and second RAN components for the duration of the session event, as shown by block 708.

In some embodiments, the first RAN component may be the same RAN component as the second RAN component, such as in FIG. 4B, for instance. As such, the first initiation message may be a SIP INVITE message that includes: (i) a TO field that identifies the first access terminal and (ii) a VIA field that includes the IP address of the first RAN component. Accordingly, the IMS network may send a SIP RESPONSE message, other responsive messaging, and or session data during the IMS session event, to the IP address of the first RAN component.

In other embodiments, the first RAN component may be a different RAN component from the second RAN component, such as in FIG. 4A, for instance. As such, the first initiation message may be a SIP INVITE message that includes: (i) a TO field that identifies the target access terminal and (ii) a VIA field that includes the IP address of the second RAN component. Accordingly, the second initiation message may be a second SIP INVITE message, which the IMS network sends to the IP address of the second RAN component. Further, the second SIP INVITE message may include: (i) a TO field that identifies the target access terminal and/or (ii) a FROM field that identifies a source access terminal (e.g., the first access terminal). As noted above, the information in the TO field and/or in the FROM field may simply be passed through by the IMS network to the second RAN component, which in turn can use this information for routing.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method for providing access to IMS services, wherein the method is carried out by a radio access network (RAN) that provides service in at least one coverage area, the method comprising:

a first RAN component sending a registration message to an IMS network in order to register the first RAN component with the IMS network, wherein the IMS registration message provides an IP address at which to register the first RAN component;

the first RAN component receiving a service request from a first access terminal, wherein the first RAN component is a serving RAN component for the first access terminal; and in response to receiving the service request, the first RAN component engaging in an IMS service on behalf of the first access terminal, wherein engaging in the IMS service on behalf of the first access terminal comprises sending the IMS network a first initiation message for a session event, wherein the first initiation message comprises: (i) a field that identifies the first access terminal and (ii) a field that includes an IP address of a second RAN component that serves a target access terminal;

wherein the first RAN component is a different RAN component from the second RAN component, wherein the target access terminal is a second access terminal that is different from the first access terminal, wherein the service request comprises an identifier of the target access terminal, and wherein engaging in an IMS service on behalf of the first access terminal further comprises, during the session event:

receiving a first message that comprises session data and a TO field that identifies the first access terminal, wherein the session message is received at the registered IP address of the first RAN component; and sending a second session message to the first access terminal, wherein the second session message provides the first access terminal with the session data from the first session message.

2. The method of claim 1, wherein the first and second RAN components comprise base station controllers in the RAN.

3. The method of claim 1, wherein the first initiation message comprises a first SIP INVITE message.

4. The method of claim 1, wherein the first RAN component is the same RAN component as the second RAN component, and wherein the first access terminal is the target access terminal.

5. The method of claim 1, wherein the first RAN component is a different RAN component from the second RAN component, wherein the target access terminal is a second access terminal that is different from the first access terminal, and wherein the service request comprises an identifier of the target access terminal, the method further comprising:

in response to receiving the service request and before engaging in an IMS service on behalf of the first access terminal, the RAN component determining the IP address of the second RAN component that serves the target access terminal.

6. The method of claim 5, wherein the service request comprises an outbound call message to initiate a call from the first access terminal to the target access terminal, and wherein engaging in the IMS service on behalf of the first access terminal comprises engaging in a voice-over-IP call with the target access terminal via the second RAN component that serves the target access terminal.

7. The method of claim 5, wherein determining the IP address of the second RAN component that serves the target access terminal comprises querying an location register for the IP address of the second RAN component.

8. The method of claim 1, further comprising:
receiving a first mobile-station registration message from the first access terminal, wherein the first mobile-station registration message registers the first access terminal in a first coverage area of the RAN; and
responsive to receiving the first mobile-station registration message from the first access terminal, the RAN entity:
(a) sending a second mobile-station registration message to a location register in order to register the first access terminal in the first coverage area; and
(b) providing the HLR with an indication that the first access terminal is available at the IP address of the RAN entity.

9. The method of claim 1, wherein the first session message further comprises a FROM field that identifies the target access terminal.

10. A system comprising:
a non-transitory computer-readable medium;
program instructions stored on the non-transitory computer-readable medium and executable by at least one processor to:
cause a first RAN component to send a registration message to an IMS network in order to register the first RAN component with the IMS network, wherein the IMS registration message provides an IP address at which to register the first RAN component;
receive a service request from a first access terminal, wherein the first RAN component is a serving RAN component for the first access terminal; and
in response to the service request, cause the first RAN component to engage in an IMS service on behalf of the first access terminal, wherein engaging in the IMS service on behalf of the first access terminal comprises sending the IMS network a first initiation message for a session event, wherein the first initiation message comprises: (i) a field that identifies the first access terminal and (ii) a field that includes an IP address of a second RAN component that serves a target access terminal;
wherein the first RAN component is a different RAN component from the second RAN component, wherein the target access terminal is a second access terminal that is different from the first access terminal, wherein the service request comprises an identifier of the target access terminal, and wherein the engagement in an IMS service on behalf of the first access terminal further comprises, during the session event:
receipt a first message that comprises session data and a TO field that identifies the first access terminal, wherein the session message is received at the registered IP address of the first RAN component; and
transmission of a second session message to the first access terminal, wherein the second session message provides the first access terminal with the session data from the first session message.

11. The system of claim 10, further comprising
program instructions stored on the non-transitory computer-readable medium and executable by at least one processor to:
receive, at the first RAN component, a first mobile-station registration message to register the first access terminal in a first coverage area of the RAN;
in response to receipt of the first mobile-station registration message, cause the first RAN component to:
(a) send a second mobile-station registration message to a location register in order to register the first access terminal in the first coverage area; and
(c) provide the HLR with an indication that the first access terminal is available at the IP address of the RAN entity.

12. A method comprising:
at an IMS network, receiving a registration message from each of one or more RAN components, wherein the registration message indicates an IP address of the respective RAN component;
the IMS network receiving from a first RAN component a first initiation message for a session event, wherein the first initiation message indicates an IMS service or application for which initiation of a session event is desired, and wherein the first initiation message comprises: (i) a field that identifies a target access terminal and (ii) a field that includes an IP address of a second RAN component that serves the target access terminal; and
in response to the first initiation message, the IMS network initiating the session event, wherein initiating the session event comprises sending a second initiation message to the IP address of the second RAN component, wherein the second initiation message comprises a field that that identifies the target access terminal.

13. The method of claim 12, further comprising, for each registration message that is received, the IMS network:
storing in a service profile of the respective RAN component, data that an indication of the IP address indicated by the registration message; and
allocating IMS-network resources for the RAN component and reserving the allocated IMS-network resources for the RAN component during a registration state between the RAN component and the IMS network.

14. The method of claim 12, wherein the one or more RAN components from which registration messages are received comprise one or more base station controllers.

15. The method of claim 12, wherein the first initiation message originates from the first RAN component.

16. The method of claim 12, wherein the first initiation message comprises a first SIP INVITE message and the second initiation message comprises a second SIP INVITE message.

17. The method of claim 12, wherein the first RAN component is the same RAN component as the second RAN component.

18. The method of claim 17:
wherein the first initiation message comprises: (i) a TO field that identifies the target access terminal and (ii) a VIA field that includes the IP address of the first RAN component; and
wherein the second initiation message is sent to the IP address of the first RAN component, and wherein the second initiation message comprises a TO field that identifies the target access terminal.

19. The method of claim 12, wherein the first RAN component is a different RAN component from the second RAN component.

20. The method of claim 19:
wherein the first initiation message comprises a first SIP INVITE message, wherein the first SIP INVITE message comprises: (i) a TO field that identifies the target access terminal and (ii) a VIA field that includes the IP address of the second RAN component; and
wherein the second initiation message comprises a second SIP INVITE message that is sent to the IP address of the second RAN component, wherein the second SIP INVITE message includes a TO field that identifies the target access terminal.

21. The method of claim 20, wherein the first SIP INVITE message further comprises a FROM field that identifies a source access terminal, and wherein the second initiation message comprises a FROM field that identifies the source access terminal.

* * * * *